United States Patent
Shaanan et al.

(10) Patent No.: US 6,474,221 B2
(45) Date of Patent: Nov. 5, 2002

(54) WATER AND COFFEE DISTRIBUTOR FOR COFFEE MACHINE

(75) Inventors: Gad Shaanan, Montreal; Walter Francovich, Pierrefonds, both of (CA)

(73) Assignee: Newco Enterprises Inc., St. Charles, MO (US)

( * ) Notice: Subject to any disclaimer, the term of this patent is extended or adjusted under 35 U.S.C. 154(b) by 0 days.

(21) Appl. No.: 09/846,315

(22) Filed: May 2, 2001

(65) Prior Publication Data

US 2001/0035097 A1 Nov. 1, 2001

Related U.S. Application Data

(60) Provisional application No. 60/201,680, filed on May 3, 2000.

(51) Int. Cl.[7] ............................................. A47J 31/00
(52) U.S. Cl. ..................... 99/289 R; 99/291; 222/144.5
(58) Field of Search ............................ 99/289 R, 291, 99/283, 282, 280, 290, 298, 316, 323.3; 222/144.5, 145.1, 145.4, 129.1, 146.2; 221/95, 150 A, 174, 225, 224

(56) References Cited

U.S. PATENT DOCUMENTS

| | | | |
|---|---|---|---|
| 5,158,793 A | * 10/1992 | Helbling | 99/289 R |
| 5,186,399 A | 2/1993 | Knepler et al. | 241/34 |
| 5,568,763 A | 10/1996 | Künzler | 99/280 |
| 6,155,158 A | * 12/2000 | Anson | 99/289 R |

* cited by examiner

Primary Examiner—Reginald L. Alexander
(74) Attorney, Agent, or Firm—Paul M. Denk

(57) ABSTRACT

A distributor for a coffee machine and a method for making coffee with options for selected quantity and types of coffee to be served are disclosed. The distributor has three fluid passages and operable between first and second positions. In the first position a first passage is adapted to receive a water and coffee mixture from a first hopper to be delivered to a first brewer or a second passage is adapted to receive a water and coffee mixture from a second hopper to be delivered to a second brewer. In the second position a third passage is adapted to receive a water and coffee mixture from either selected one of the first and second hoppers to be distributed substantial-equally to the first and second brewers. The invention provides a simple distribution system for the coffee machine with options for selected quantities and types of coffee. The invention also advantageously makes it possible to quickly serve a freshly brewed coffee with a selected quantity and type.

15 Claims, 7 Drawing Sheets

WATER AND COFFEE DISTRIBUTOR FOR COFFEE MACHINE

This application claims the benefit of U.S. Provisional Application No. 60/201,680 filed May 3, 2000.

BACKGROUND OF THE INVENTION

1. Field of the Invention

The present invention relates to a beverage machine, such as a coffee machine, more particularly to a distribution system for a coffee machine with options for selected types and quantities of coffee to be served.

2. Description of the Prior Art

An automated coffee machine is understood to be a machine in which the steps of the preparation cycle occur automatically. In recent years automated coffee machines have become increasingly popular in restaurants, institutions and other commercial places. In an automated coffee machine with options for selected types and quantities a distribution system or a control system is used to provide the selections. As one example, Knepler et al describe, in their U.S. Pat. No. 5,186,399, issued on Feb. 16, 1993, a digital control system for a coffee grinder and associated coffee brewer. The coffee grinder has a dual hopper, and is conveniently programmable and automatically operable for selecting bean type and grinding with accuracy bean quantities ranging from a few ounces for brewing a few cups of coffee to larger quantities for brewing several gallons of coffee. The control system allows one or more coffee grinders either of the same type or different types for a brewer for making multi-cup quantities or urns for making gallon quantities.

Another example is U.S. Pat. No. 5,568,763 issued on Oct. 29, 1996, in which Kunzler describes controlling means for an automatic coffee machine which has a supply of coffee beans, a coffee bean grinding device, a water heating device, a brewing chamber, and a dispenser for brewed coffee. The coffee machine also includes at least one coffee selector switch in electronic communication with control processor for operating the coffee machine. The method of controlling a coffee machine includes the steps of actuating the selector switch for first time and starting the grinding of an amount of coffee beans for a coffee brewing cycle using a first set of brewing parameters in response thereto, monitoring the selector switch for a predetermined period of time the range of from 1 to 2 seconds, delaying the start of coffee brewing in response to the actuation of the selector switch for a second time within the predetermined time period, and then grinding an additional amount of coffee beans and resuming the coffee brewing cycle using the second set of brewing parameters in response to the second actuation of the selector switch. The first set of brewing parameters is used to brew a single size serving of coffee, and the second set of brewing parameters are used to brew a double size serving of coffee. The step of loading the first set of brewing parameters into the control processor of the coffee machine occurs in response to actuating the selector switch for the first time, and the step of replacing the first set of brewing parameters with the second set of brewing parameters in the control processor occurs in response to actuating the selector for a second time, whereupon the start of the coffee cycle is resumed using the second set of parameters to brew the coffee.

SUMMARY OF THE INVENTION

It is one object of the present invention to provide a beverage machine, such as a coffee machine having a simple distribution system for options for selected types and quantities of coffee to be brewed and served.

Another object of the present invention is to provide a distributor for a coffee machine with options for selected types of quantities of coffee which has two coffee mixing hoppers, each for one type of coffee, and two brewers, each having a predetermined capacity.

A further object of the present invention is to provide a method for making a quick serving of a beverage with options for selected types and quantities.

Generally, a beverage machine, in accordance with one aspect of the present invention, has first and second beverage hoppers, each for a selected type of beverage mixture, first and second brewers, each having a predetermined capacity, and a distributor having three fluid passages, operatively attached to the machine and moveable with respect to the machine between first and second positions. An actuator is supported to the machine and operatively connected to the distributor, adapted to move the distributor between the first and second positions. In the first position, a first passage of the distributor is adapted to receive a beverage mixture from the first hopper to be delivered to the first brewer or a second passage of the distributor is adapted to receive a beverage mixture from the second hopper to be delivered to the second brewer. In the second position, a third passage of the distributor is adapted to receive a beverage mixture from a selected one of the first and second hoppers to be distributed substantial-equally to the first and second brewers.

More especially according to the preferred embodiment of the present invention, a water and coffee distributor for a coffee machine is provided. The coffee machine has first and second coffee hoppers, each for one type of coffee, and first and second brewers, each having a predetermined capacity. The water and coffee distributor comprises a chute adapted to be placed below the hoppers and above the brewers. The chute includes first and second receiving chambers, each having an outlet at the bottom thereof, and a third receiving chamber in fluid communication with the first and second receiving chambers. Each of the three receiving chambers has a top opening. The chute is pivotable with respect to the machine between first and second positions. In the first position the top opening of the first receiving chamber aligns an outlet of the first hopper and the top opening of the second receiving chamber aligns an outlet of the second hopper. In the second position, the opening of the third receiving chamber aligns both outlets of the first and second hoppers. A pivoting actuator is mounted to the machine and is detachably connected to the chute to pivot the chute about a pivoting line which is close to the outlet of the first and second receiving chambers so that the outlet of the first receiving chamber and the outlet of the second receiving chamber are kept aligned individually with an entry of the first brewer and an entry of the second brewer when the chute is pivoted.

In accordance with another aspect of the present invention, there is a method provided for making coffee with options for selected types and quantities, using first and second hoppers, each for one type of coffee, and first and second brewers having an equal capacity. One step is to detect a selection of quantities of coffee to be served from options for a one-cup sized serving or a double-cup sized serving. A signal according to the selection of the quantity is sent to operate the distributor which is operable between a first position for the quantity of the one-cup sized serving and a second position for the quantity of the double-cup sized serving. In the first position the distributor is to receive a water and coffee mixture of a first type from the first hopper through a first passage thereof to be delivered to the first brewer, or to receive a water and coffee mixture of a second type from a second hopper through a second passage thereof to be delivered to the second brewer. In the second position the distributor is to receive a water and coffee mixture of either type to be selected from one of the first and second hoppers through a third passage thereof to be distributed substantial-equally to the first and second brewers. Another step is to detect a selection of types of coffee and a signal according to the selection of the types of coffee is sent for preparing in a corresponding one of the first and second hoppers the coffee and water mixture of a predetermined quantity for the one-cup sized serving or double-cup sized serving, depending on the selection of the quantities. A further step includes the delivery of the selected type of water and coffee mixture of the predetermined quantity through the distributor which is in the selected position into a corresponding one or both of the brewers. A first type of coffee is brewed in the first brewer or a second type of coffee is brewed in the second brewer depending on the selection of the types of coffee when the distributor is in the first operative position. Otherwise, the first type or the second type of coffee is brewed in both the first and second brewers, depending on the selection of the type of coffee, when the distributor is in the second operative position.

The coffee machine according to the present invention advantageously has a simple structure of a distribution system for making coffee with options for selected types and quantities. It is especially advantageous to brew a double-cup sized serving of coffee of a selected type simultaneously in two identical brewers, each taking a half of the quantity for the serving, which makes a quick serving possible.

BRIEF DESCRIPTION OF THE DRAWINGS

Having thus generally described the nature of the invention, reference will now be made to the accompanying drawings, showing by way of illustration of a preferred embodiment thereof, in which.

DESCRIPTION OF THE PREFERRED EMBODIMENTS

Figure 1:
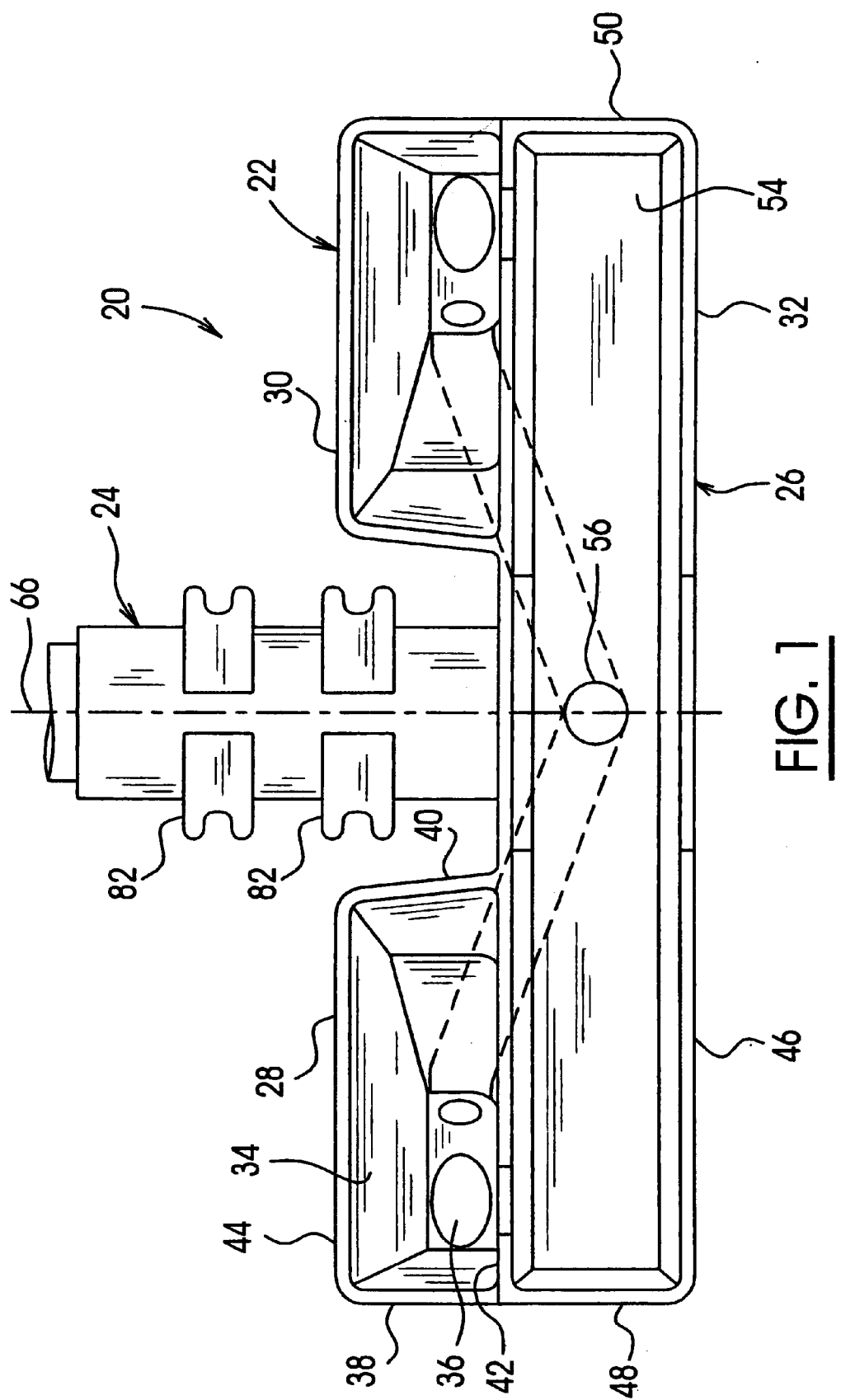
FIG. 1 is a top plan view of a distributor according to a preferred embodiment of the present invention.

Referring now to the drawings, particularly in FIGS. 1 through 4, there is shown a distributor 20 having a chute 22 and an actuator 24 for operating the chute 22 between different operative inventions.

The chute 22 includes a body 26 which has a first chamber 28, a second chamber 30 and a third chamber 32. The third chamber 32 is elongated. The first and second chambers 28,30 are identical and spaced apart from each other, attached to one side of the elongated third chamber 32 at the opposed ends.

The first chamber 28 has a hopper shape with a top opening 34 and an outlet 36 at the bottom thereof The first chamber 28 has two side: walls 38,40 extending transversely from a rear wall 42 of the third chamber 32 and a rear wall 44 to form the chamber. The side wall 40 is bent, consisting of three sections from the top to the bottom, as clearly shown in FIG. 2 to form the hopper shape of the chamber so that the top opening 34 is much greater than the outlet 36 at the bottom, which facilitates the delivery of fluid through the chamber as most hoppers do. The side wall 38 and the rear wall 44 extending also inwardly from the top to the bottom which is preferred especially when the body 26 is made from moulded plastics. The structure of the second chamber 30 is identical to the structure of the first chamber 28, and is not described redundantly.

Figure 4:
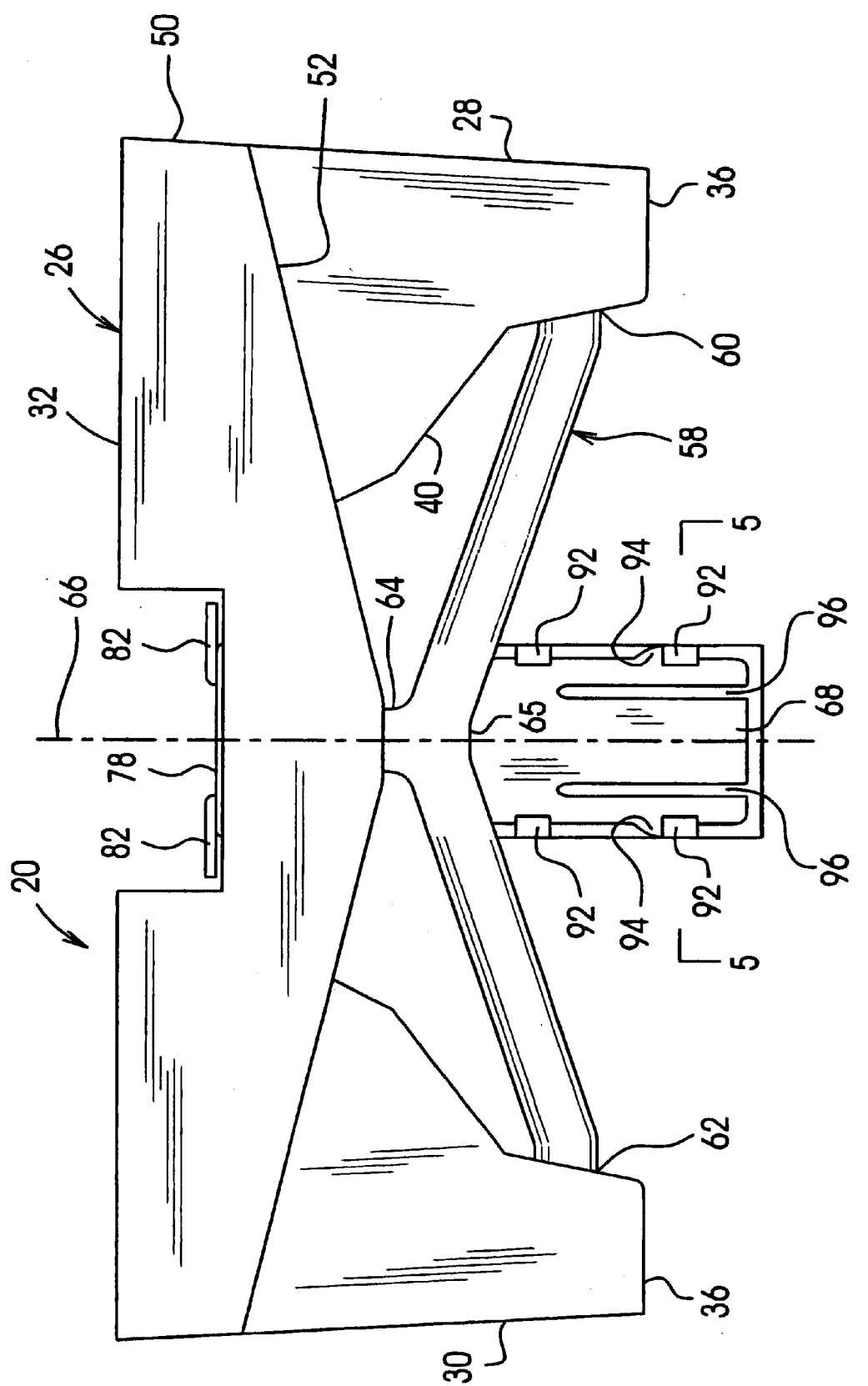
FIG. 4 is an elevational front view of the embodiment in FIG. 1, showing the attachment of a chute to the actuator.

The third chamber 32 includes the rear wall 42 and a front wall 46, and opposed end walls 48,50 with a bottom wall 52 which is shown in FIG. 4 to form the elongated chamber 32 with a top opening 54. The rear wall 42 and the front wall 46 of the third chamber 32 are roughly parallel to each other, but extend inwardly at a slight angle from the top to the bottom. Similarly, the opposed end walls 48,50 are roughly parallel to each other, but extend inwardly at a slight angle from the top to the bottom to facilitate the molding process. The bottom wall 52 extends downwardly from the opposed end walls 48, 50 towards its centre and a bottom hole 56 is defined in the centre of the bottom wall 52 so that fluid poured into the third chamber 32 at either end will be directed under its own gravity to the bottom hole 56.

Figure 3:
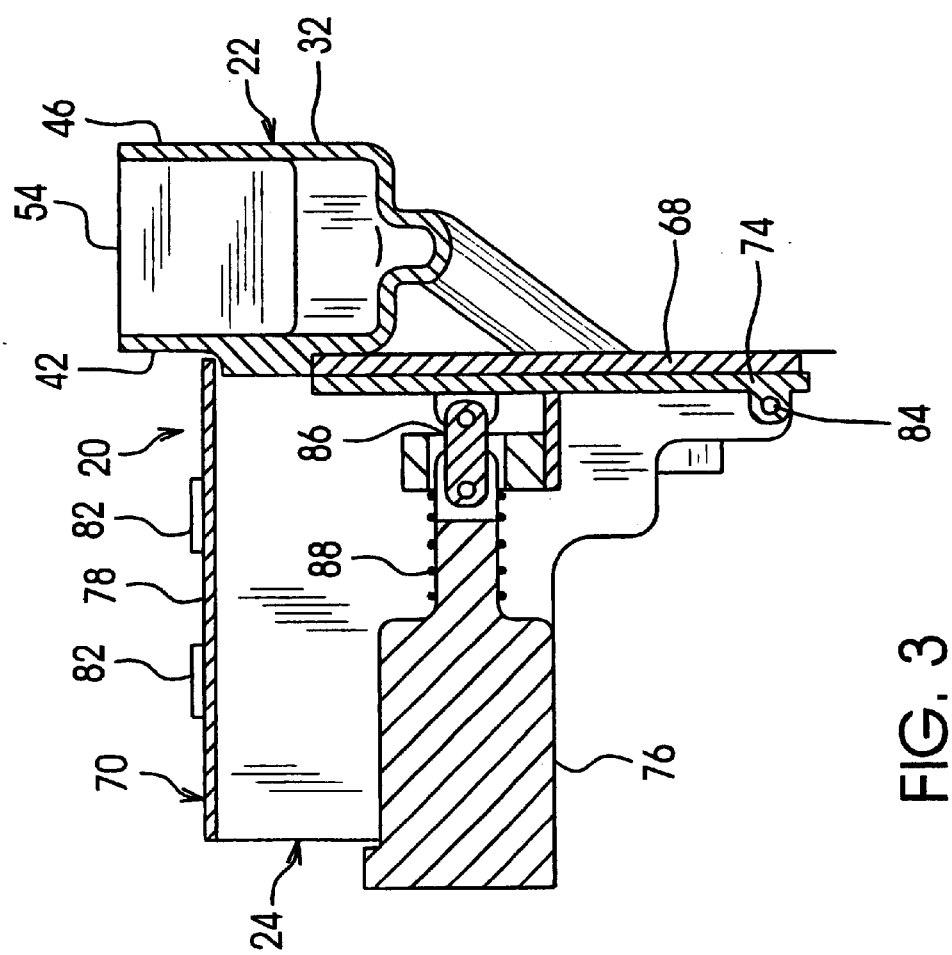
FIG. 3 is a cross-sectional view taken along the line 3—3 in FIG. 2, showing an actuator of the distributor.

A reversed Y-pipe 58 is used to communicate with the third chamber 32 and the first and second chambers 28,30. As shown in FIG. 4, the first end 60 of the reversed Y-pipe 58 is connected to the first chamber 28 in fluid communication at the bottom above the outlet 36. Similarly, a second end 62 of the reversed Y-pipe 58 is connected to the second chamber 30 in fluid communication at the bottom above the outlet 36. A third end 64 of the reversed Y-pipe 58 is connected to the bottom opening 56 of the third chamber 32. In order to distribute fluid flow from the third chamber 32 through the reversed Y-pipe 58 to exit from both outlets 36 of the first and second chambers 28,30 with equal volume, the chute 22 including the body 26 and the reversed Y-pipe 58 should be configured symmetrically about a central vertical and transverse plane, indicated by the centre line 66. The chute 22 is preferably made from plastics, and the body 26 is particularly made from a moulded plastic material. An elongated attaching plate 68, made of a plastic material, is secured at the top end to the rear wall 42 at a middle portion, as shown in FIG. 3, and will be described in detail below.

Figure 2:
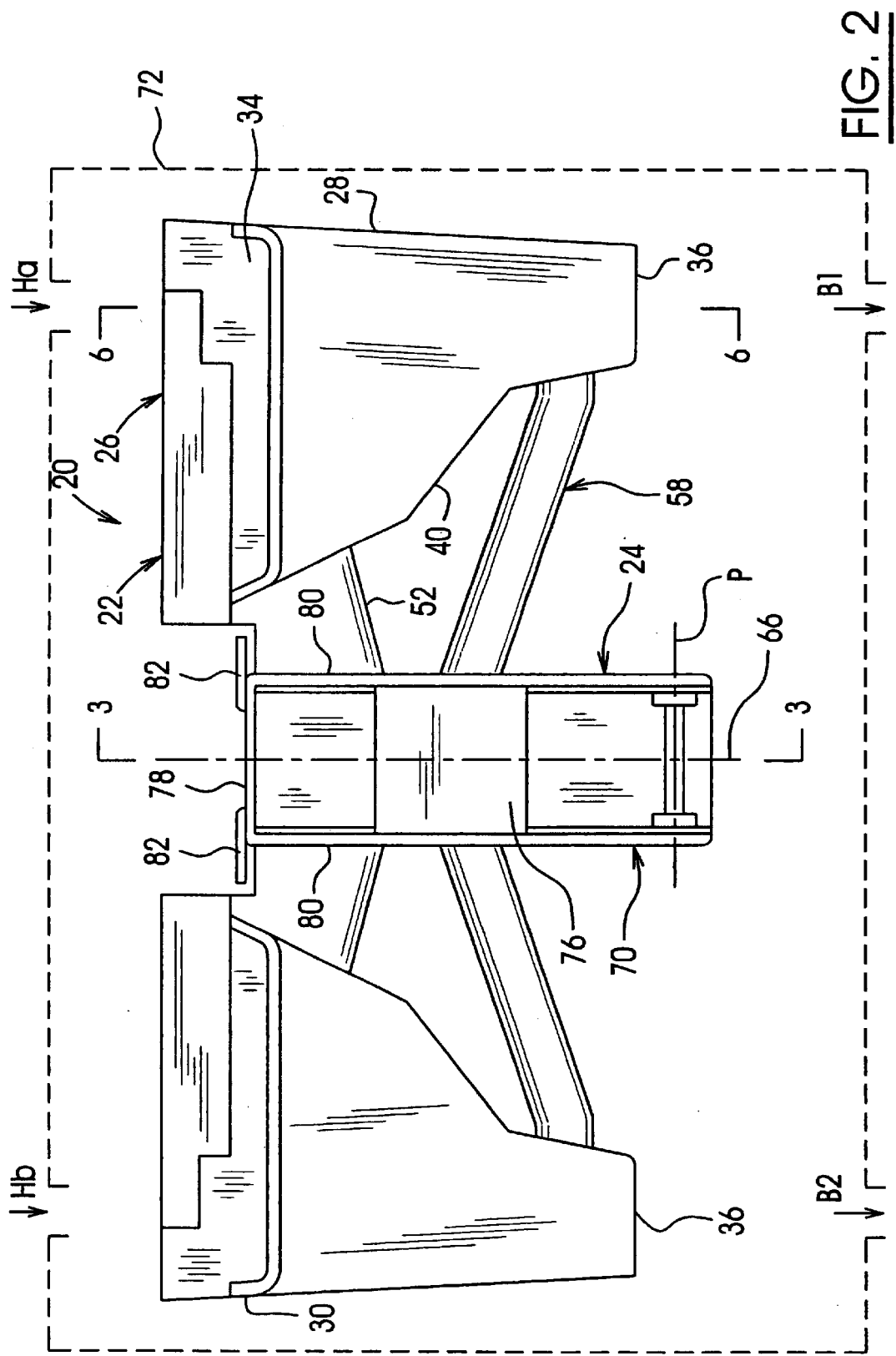
FIG. 2 is an elevational rear view of the embodiment shown in FIG. 1.
Figure 7:
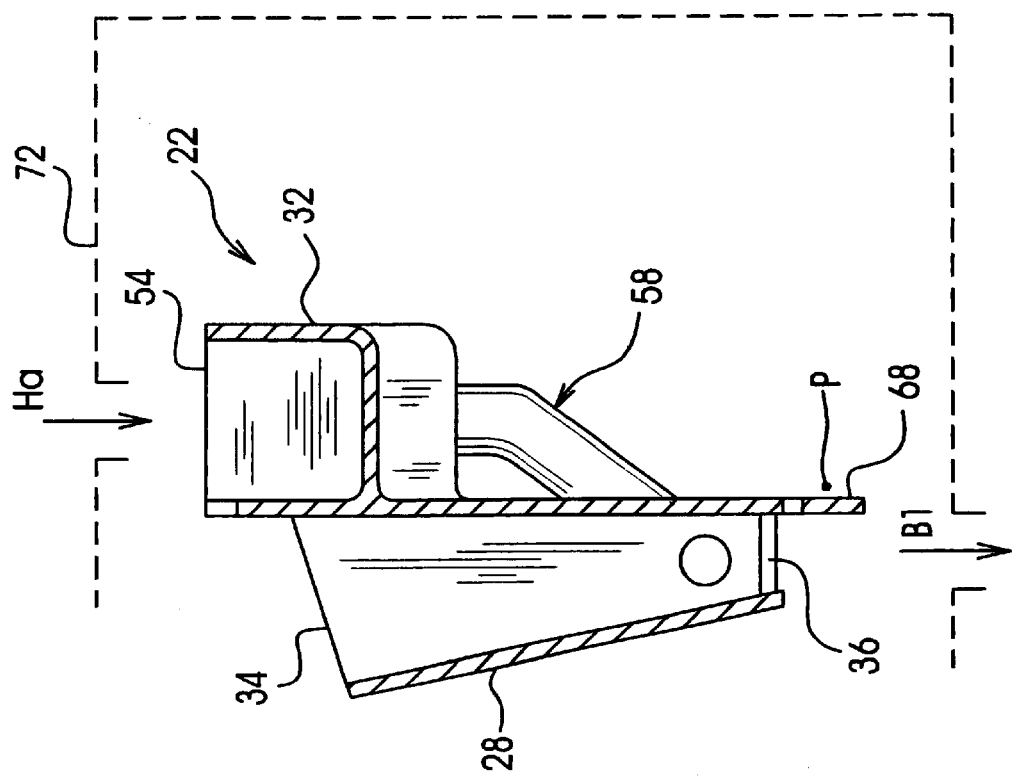
FIG. 7 is the same cross-sectional view of FIG. 6, showing the chute in the other operative position.
Figure 6:
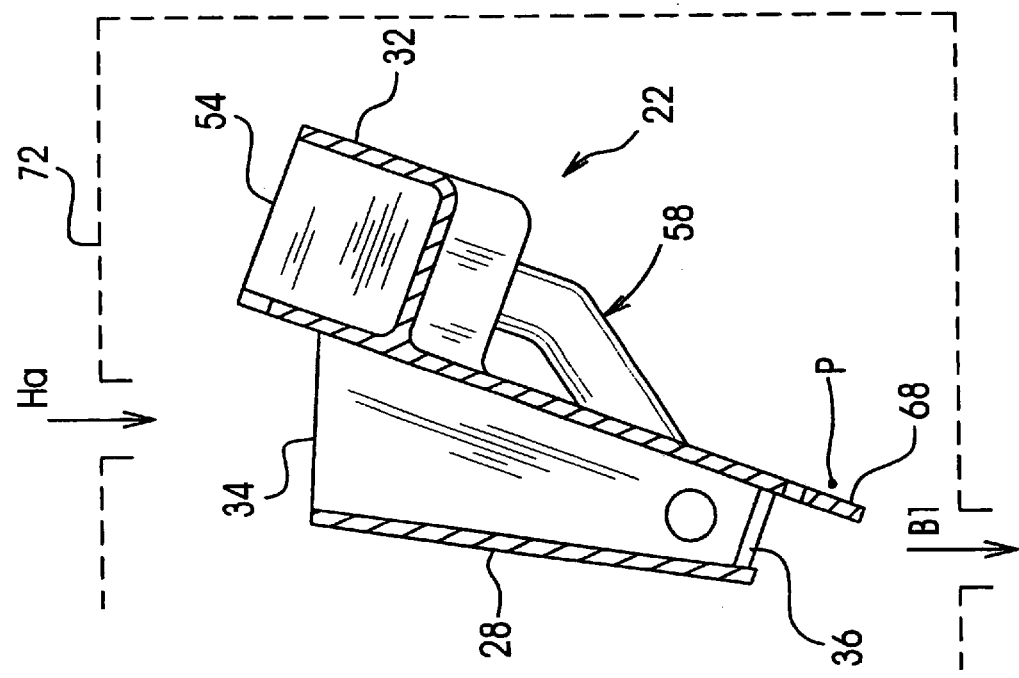
FIG. 6 is a cross-sectional view of the embodiment in FIG. 2, taken along line 6—6 with the actuator removed, showing the chute pivoted in one operative position.

The actuator 24 generally includes a solenoid 76, a mounting plate 74 and a bracket 70 adapted to be mounted to a coffee machine the structure of which is not shown but is indicated by the broken line 72 in FIGS. 2, 6 and 7. The bracket 70 has a top plate 78, and two side plates 80 extending downwardly from the top plate 78 and spaced apart to form a housing to support the solenoid 76 therein. Fastening members 82 are attached to the top plate 78 for receiving mounting screws. The mounting plate 74 is pivotally mounted to the bracket 70 through a pivoting pin 84 extending through the two side plates 80 at their lower end so that the mounting plate 74 is pivotable about the pivoting pin 84 with respect to the bracket 70 and the coffee machine. The solenoid 76 has a link assembly 86 operatively connecting the solenoid 76 and the pivoting plate 74, as shown in FIG. 3. When the solenoid 76 is energized, the link member 86 presses the mounting plate 74 to pivot clockwise about the pivoting pin 84. When the solenoid 76 is deactivated, a force exerted by the spring 88 will force the link assembly 86 to pivot the mounting plate 74 counter clockwise about the pivoting pin 84. One of the inventive features of the invention is to use the actuator of the distributor to operate the chute 22 between different operative positions and therefore, the structure and the operation of the solenoid with its auxiliary parts which are known in the art are not described in further details.

Figure 5:
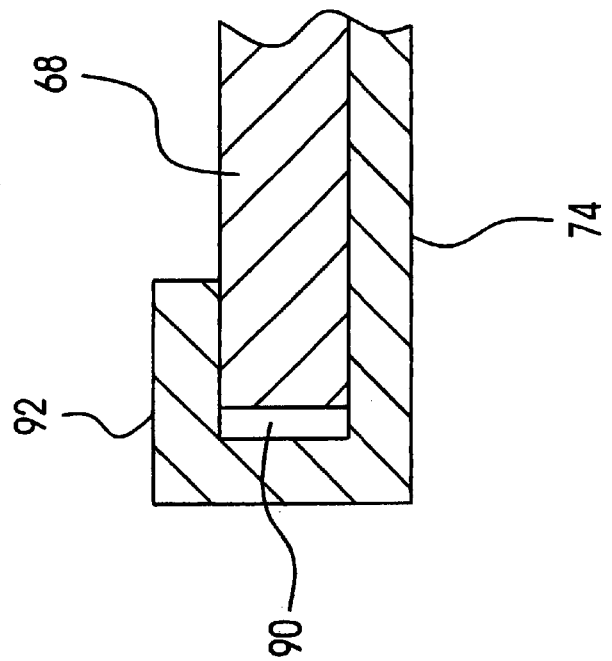
FIG. 5 is a segmental and enlarged cross-sectional view of the attachment in FIG. 4, taken along line 5—5, showing the detail thereof.

The attaching plate 68 is slidably received at the opposed sides in the respective grooves 90 of the mounting plate 74. The groove 90 is formed with two fasteners 92 at each side of the mounting plate 74 as shown in FIG. 5. A clipping member 94 protrudes from each side of the attaching plate 68. Two elongated slots 96 extend inwardly from the free end of the attaching plate 68 so that when the attaching plate 68 slides upwards in the grooves 90, the clipping members 94 will be pressed inwardly past the fastening members 92 which engage the clipping members 94 and prevent the attaching plate 68 from moving downwardly relative to the pivoting plate. With such an attachment arranged, the chute 22 is able to be removably attached to the mounting plate 74 of the actuator 70 and to be pivoted together with the mounting plate 74 about the pivoting pin 84.

In operation, the distributor 20 is mounted to the coffee machine 72 in a position below two hoppers 100 and 102, and above two coffee brewers 104 and 106, which are shown in FIGS. 8 to 11. The hoppers are used to prepare and contain a selected quantity of water and coffee mixture which is to be brewed making fresh coffee. Each hopper is for a predetermined type of coffee. The two coffee brewers are identical and designed for brewing a predetermined quantity, such as 9 ounces, of coffee for a one-cup sized serving. An example of the brewer of this type is described in the applicant's U.S. Pat. No. 5,406,882 issued Apr. 18, 1995. As shown in FIGS. 2, 6 and 7, the chute 22 is sized and mounted to the coffee machine so that the top opening 34 of the first chamber 28 and the top opening 34 of the second chamber 30 are enabled to align the respective outlet of the first hopper, indicated by arrow Ha and the outlet of the second hopper indicated by arrow Hb, while the opening 54 of the third chamber 32 is enabled to align both the outlets Ha and Hb of the hoppers. The outlet 36 at the bottom of the first chamber 28 aligns to the entry, indicated by B1, of the first brewer and the outlet 36 at the bottom of the second chamber 30 aligns the entry, indicated by arrow B2, of the second brewer.

In FIG. 6, the chute 22 is shown in its first operative position when the solenoid 76 is energized to pivot the chute 22 clockwise. In the first position, the top opening 34 of the first and second chambers 28,30 align the respective outlets Ha, Hb of the hoppers. Therefore, the fluid exiting from the outlet Ha or Hb enters into a corresponding one of the first and second chambers 28,30 and exits from the outlet 36 thereof to enter into the entry B1 or B2 of the brewers accordingly.

In FIG. 7, the chute 22 is in the second operative position when the solenoid 76 is deactivated as shown in FIG. 3. In the second operative position, the opening 54 of the third chamber 32 aligns both the outlets Ha and Hb of the hoppers so that the fluid exiting from either one of the outlets Ha and Hb of the hoppers enters into the third chamber 32 of the chute 22. However, it is noted that the third chamber 32 receives fluid from either one of the outlets Ha and Hb but not both of them at each time because the type of the water and the coffee mixture contained in each of the hoppers is different, and the different types of the water and coffee mixtures are not allowed to be mixed together. This may be controlled by a controller of the machine. The fluid entering the third chamber 32 is directed into the reversed Y-pipe 58 through the third end 64 thereof. The reversed Y-pipe 58 distributes the fluid equally into the first and second chambers 28,30 and the equally distributed fluid in the first and second chambers 28,32 are further directed into the respective entry B1 and B2 of the two brewers.

It is noted that the outlets 36 of the first and second chambers 28,30 are maintained aligned with the respective entries B1,B2 of the brewers. In order to ensure this feature, a centre line, indicated by P, of the pivoting pin 84 must be close to the outlets 36 of the first and second chambers. It is also noted that a certain quantity of fluid will be temporarily accumulated in the first or second chamber 28,30 when the quantity of the fluid entering the top opening 34 of the chamber is greater than the quantity of the fluid exiting from the outlet 36 within a time period. If the accumulated fluid in the first or second chamber 28,30 reaches a height level higher than the dividing point 65 of the reversed Y-pipe 58, (see FIG. 4) the fluid in the first or second chamber will flow into the other one of the first and second chambers through the reversed Y-pipe. Therefore, the bottom wall 52 of the third chamber 32 must be above the outlets 36 at the bottom of the first and second chambers 28,30 to provide a space adequate for mounting the reversed Y-pipe so that a height difference between the dividing point 65 of the reversed Y-pipe 58 and the outlets 36 of the first and second chambers 28,30 is ensured to prevent the fluid temporarily accumulated in one of the first and second chambers 28,30 from flowing through the reversed Y-pipe 58 into the other in a normal operation.

A method for making coffee with options for selected types and quantities using the coffee machine having the distributor described as above is described below with reference to FIGS. 8 through 11.

Figure 8:
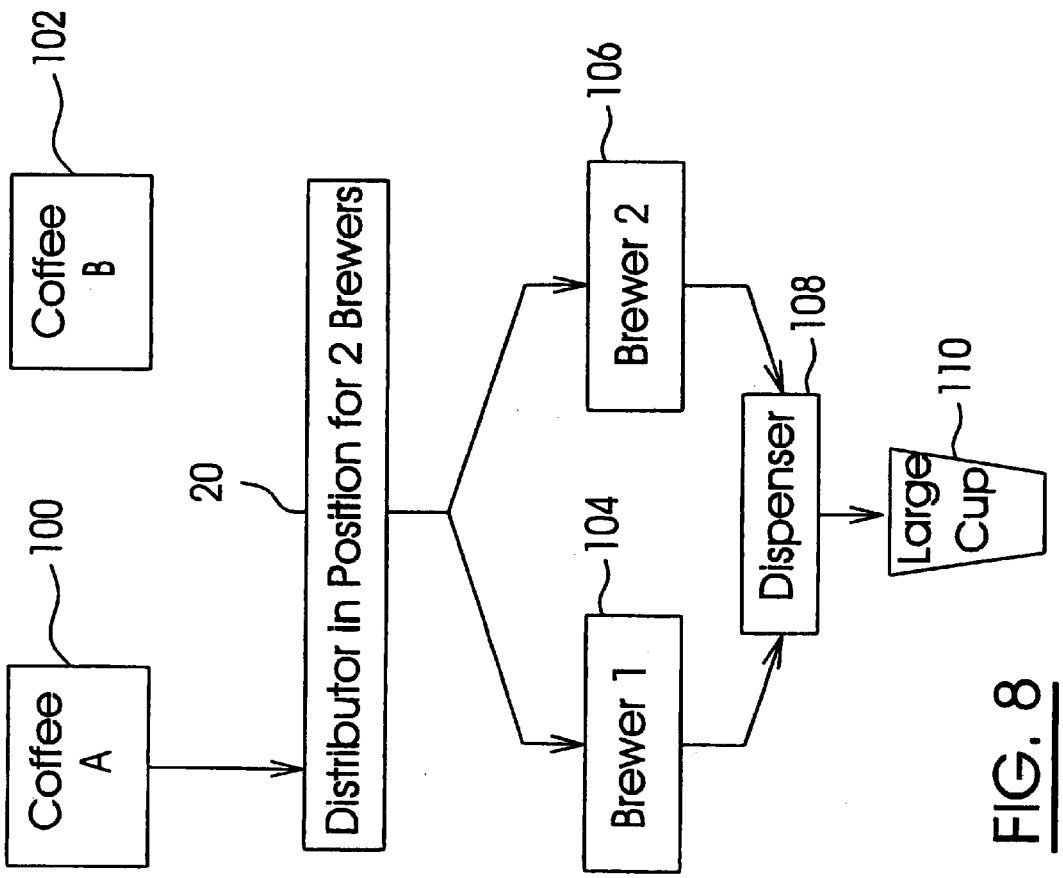
FIG. 8 is a diagram showing a process according to the preferred embodiment of the invention for making coffee A of a double-cup sized serving.

As shown in FIG. 8, the machine first detects a selection of quantities of coffee to be served from options for a double-cup sized serving, and then sends a signal accordingly to the actuator 24 to operate the chute 22 in its second operative position as shown in FIG. 7. The machine further detects a selection of a type of coffee, for example coffee A, and then a signal is sent accordingly to prepare a water and coffee A mixture in the first hopper 100. The quantity of the water and coffee A mixture prepared in the first hopper is for the double-cup sized serving, for example 18 ounces. The 18 ounces of water and coffee A mixture is delivered from the first hopper 100 into the distributor 20, and distributed through the third chamber 32 and the reversed Y-pipe 58 into both the first and second coffee brewers 104 and 106. The quantity of the water and coffee A mixture distributed into the first and second coffee brewers 104,106 is equal, 9 ounces. The water and coffee A mixture of 9 ounces is brewed in each of coffee brewers 104,106. The freshly brewed coffee A in both first and second coffee brewers 104,106 is dispensed through a common dispenser 108 to fill up an 18 ounce cup 110 for the double-cup sized serving.

Figure 9:
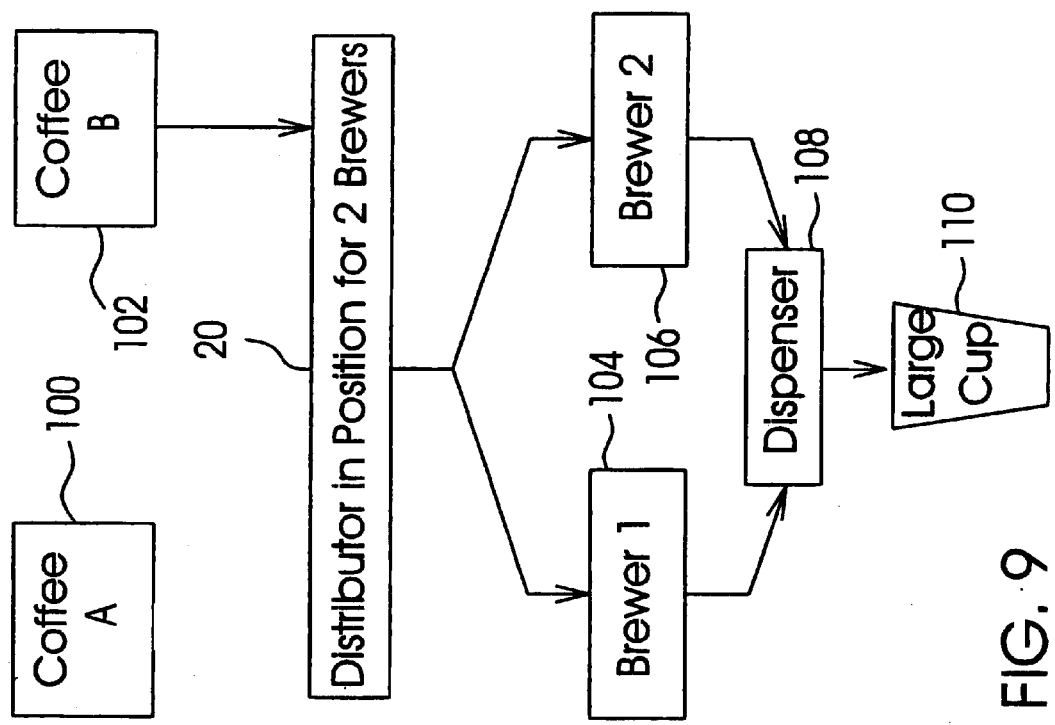
FIG. 9 is a diagram according to the preferred embodiment of the invention showing a process for making coffee B of a double-cup sized serving.

In FIG. 9, the machine detects a selection of quantities of coffee to be served for a double-cup sized serving, 18 ounces, and therefore the distributor 20 is operated in the second position as shown in FIG. 7. The machine further detects a selection for a type B of coffee, and therefore a water and coffee B mixture is prepared in the second hopper 102. The quantity of the water and coffee B mixture prepared in the second hopper 102 is 18 ounces. The water and coffee B mixture is distributed through the third chamber 32 and the reversed Y-pipe 58 equally into the first and second coffee brewers 104 and 106, 9 ounces for each. Similar to the process illustrated in FIG. 8, each of the first and second brewers 104,106 brews 9 ounces of coffee B and discharges the freshly brewed coffee B through the common dispenser 108 to fill up the 18 ounce cup 110 for the double-cup sized serving of coffee B.

Figure 10:
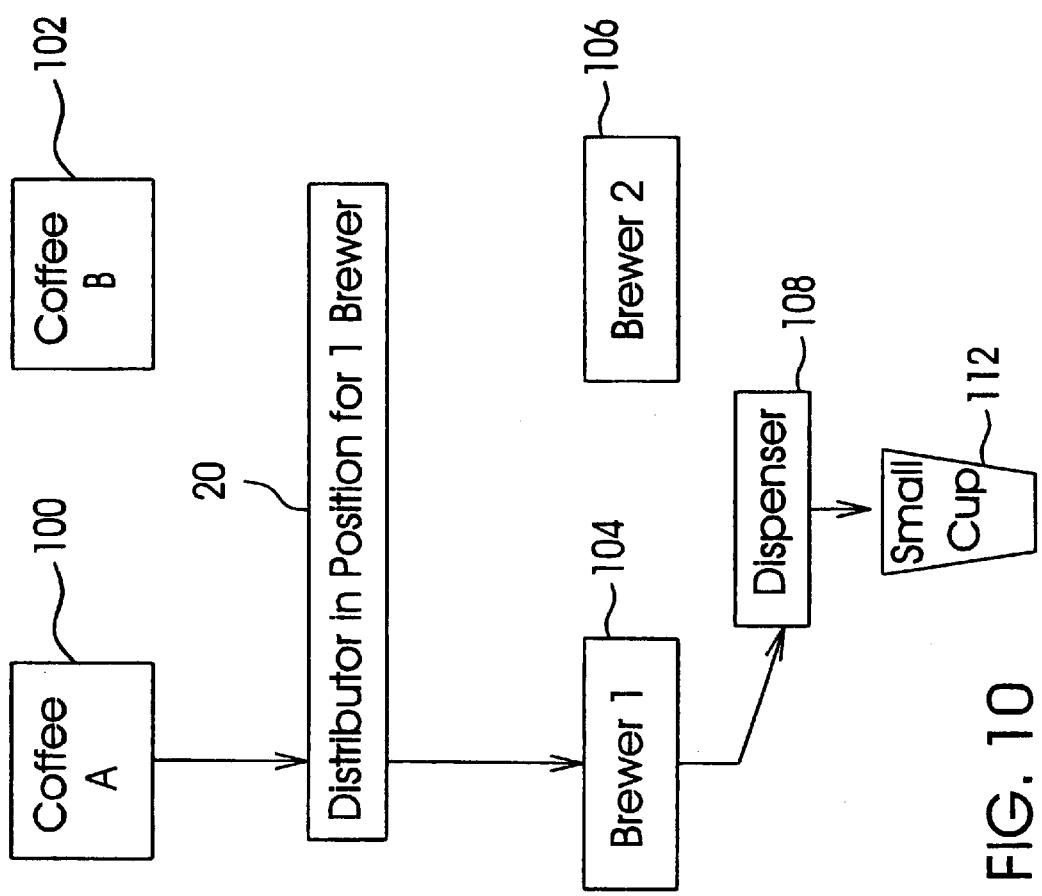
FIG. 10 is a diagram according to the preferred embodiment of the invention showing a process for making coffee A of a one-cup sized serving.

The process for making one-cup sized serving, 9 ounces, of coffee A is illustrated in FIG. 10. A signal is sent to the actuator 24 to operate the distributor 20 in its first operative position as shown in FIG. 6 when a selection of quantities for the one-cup sized serving is detected. 9 ounces of water and coffee A mixture is prepared and contained in the first hopper 100 when a signal corresponding to the selection of coffee B is received. The water and coffee B mixture of 9 ounces is delivered from the first hopper 100 into the distributor 20, particularly directed through the first chamber 28 into the first coffee brewer 104. The water and coffee B mixture of 9 ounces is brewed in the first coffee brewer 104 and discharged through the dispenser 108 into the 9 ounce cup 112 for the one-cup sized serving of coffee A.

Figure 11:
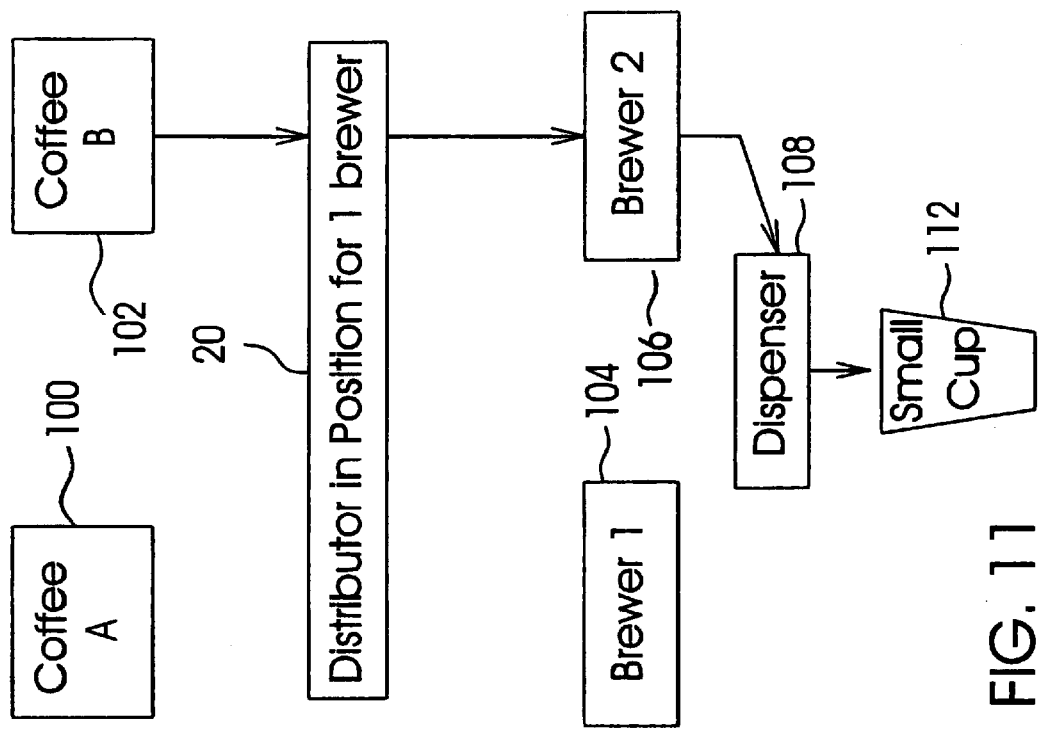
FIG. 11 is a diagram according to the preferred embodiment of the present invention showing a process for making coffee B of a one-cup sized serving.

As shown in FIG. 11, a water and coffee B mixture of 9 ounces is prepared in the second hopper 102 when the selection for 9 ounces of coffee B is detected and the distributor 20 is operated accordingly to the first position as shown in FIG. 6. The prepared water and coffee B mixture of 9 ounces is delivered from the second hopper 102 through the distributor 20, particularly directed through the second chamber 30 into the second coffee brewer 106. The second coffee brewer 106 brews the coffee B of 9 ounces therein and then discharges the freshly brewed coffee B through the dispenser 108 into the 9 ounce cup for the one-cup sized serving of coffee B.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as are within the true spirit and scope of the invention.

We claim:

1. A beverage machine which has first and second beverage hoppers, each for one type of the beverage mixture, and first and second brewers, each having a predetermined capacity, the beverage machine comprising:
   a distributor having three fluid passages, operatively attached to the machine, and movable with respect to the machine between a first position in which a first passage is adapted to receive a beverage mixture from the first hopper to be delivered to the first brewer or a second passage is adapted to receive a beverage mixture from the second hopper to be delivered to the second brewer and a second position in which a third passage is adapted to receive a beverage mixture from a selected one of the first and second hoppers to be distributed substantial-equally to the first and second brewers; and
   an actuator supported to the machine and operatively connected to the distributor, adapted to move the distributor between the first and second positions.

2. A beverage machine as claimed in claim 1 wherein each of the passages include a chamber having a top opening, a third chamber being elongate and having a length adequate to receive the beverage mixture from an outlet of either one of the hoppers positioned above the distributor when the distributor is in the second position, and first and second chambers attached to the third chamber, the first chamber aligning the outlet of the first hopper and the second chamber aligning the outlet of the second hopper when the distributor is in the first position.

3. A beverage machine as claimed in claim 2 wherein each of the first and second chambers includes an outlet at a bottom thereof and the third chamber is in fluid communication with both the first and second chambers.

4. A beverage machine as claimed in claim 3 wherein the distributor is pivoted between the first and second positions and the outlets of the first and second chambers are kept aligned with the respective brewers in both first and second positions of the distributor.

5. A beverage machine as claimed in claim 3 wherein the distributor includes a reversed Y-pipe interconnecting the first, second and third chambers.

6. A beverage machine as claimed in claim 5 wherein a bottom of the third chamber is located at a level above the outlets of the first and second chambers, a third end of the reversed Y-pipe being connected to the bottom at a centre of the third chamber, and first and second ends of the reversed Y-pipe being connected to the respective first and second chambers near the respective outlets thereof.

7. A beverage machine as claimed in claim 6 wherein the distributor is configured symmetrically about a vertical and transverse plane.

8. A beverage machine as claimed in claim 7 wherein a height difference between a dividing point of the reversed Y-pipe and the outlets of the first and second chambers is adequate to ensure that the beverage mixture in one of the first and second chambers should not be able to flow into the other of the first and second chambers via the Y-pipe during a normal operation.

9. A beverage machine as claimed in claim 4 wherein the actuator includes a bracket adapted to be mounted to the machine, a mounting plate pivotally mounted to the bracket and adapted to removably secure the distributor, and a solenoid supported to the bracket to actuate a pivotal movement of the mounting plate.

10. A beverage machine as claimed in claim 9 wherein a pivoting line of the mounting plate is close to the outlets of the first and second chambers.

11. A beverage machine as claimed in claim 10 wherein the distributor includes an attaching plate for removably attaching the distributor to the mounting plate of the actuator.

12. A beverage machine as claimed in claim 11 wherein clip means is provided between the attaching plate and the mounting plate for removably securing the distributor to the actuator.

13. A water and coffee distributor for a coffee machine which has first and second coffee hoppers, each for one type of coffee, and first and second brewers, each having a predetermined capacity, the distributor comprising:
   a chute adapted to be placed below the hoppers and above the brewers, including first and second receiving chambers, each having an outlet at an bottom thereof, and a third receiving chamber in fluid communication with the first and second receiving chambers, each of the three receiving chambers having an top opening;
   the chute being pivotable with respect to the machine between a first position in which the top opening of the first receiving chamber aligns an outlet of the first hopper and the top opening of the second receiving chamber aligns an outlet of the second hopper and a second position in which the third receiving chamber aligns both outlets of the first and second hoppers; and a pivoting actuator mounted to the machine and detachably connected to the chute to pivot the chute about a pivoting line which is close to the outlet of the first and second receiving chambers so that the outlet of the first receiving chamber and the outlet of the second receiving chamber are kept aligned individually with an entry of the first brewer and an entry of the second brewer when the chute is pivoted.

14. A water and coffee distributor as claimed in claim 13 wherein the chute comprises a reversed Y-pipe, a third end of a reversed Y-pipe being connected to a bottom of the third chamber which is located at a level above the outlets of the first and second receiving chambers, and first and second ends of the reversed Y-pipe being connected to the respective first and second chambers near the respective outlets thereof, a height from the bottom of the first and second chambers to a dividing point of the Y-pipe being adequate to prevent the coffee mixture from flowing via the Y-pipe from one to the other of the first and second receiving chambers during a normal operation.

15. A water and coffee distributor as claimed in claim 14 wherein the chute is configured symmetrically to ensure the water and coffee mixture distributed substantial-equally from the third receiving chamber to the first and second receiving chambers.

* * * * *